(12) United States Patent
Xu

(10) Patent No.: US 12,473,311 B2
(45) Date of Patent: Nov. 18, 2025

(54) LOW IRON HYDROUS PHOSPHOLIPID AND METHOD FOR SEPARATING LOW-IRON HYDROUS PHOSPHOLIPIDS FROM SOYBEAN OIL SEDIMENTS

(71) Applicants: INNER MONGOLIA BOBEYMAN TECHNOLOGY CO. LTD, Inner Mongolia Autonomous (CN); SHANGHAI TAIWEI PHARMACEUTICAL CORP. LTD, Shanghai (CN)

(72) Inventor: Ziqian Xu, Inner Mongolia Autonomous Region (CN)

(73) Assignees: INNER MONGOLIA BOBEYMAN TECHNOLOGY CO. LTD, Hohhot (CN); SHANGHAI TAIWEI PHARMACEUTICAL CORP. LTD, Shanghai (CN)

( * ) Notice: Subject to any disclaimer, the term of this patent is extended or adjusted under 35 U.S.C. 154(b) by 730 days.

(21) Appl. No.: 17/830,378

(22) Filed: Jun. 2, 2022

(65) Prior Publication Data

US 2022/0289770 A1    Sep. 15, 2022

Related U.S. Application Data

(63) Continuation of application No. PCT/CN2020/135887, filed on Dec. 11, 2020.

(30) Foreign Application Priority Data

May 26, 2020 (CN) .......... 202010454426.X
May 26, 2020 (CN) .......... 202010455240.6

(51) Int. Cl.
*C07F 9/10* (2006.01)
*B01D 11/04* (2006.01)

(52) U.S. Cl.
CPC .......... *C07F 9/103* (2013.01); *B01D 11/0492* (2013.01)

(58) Field of Classification Search
CPC . C07F 9/103; B01D 11/0492; B01D 11/0434; C11B 13/00
See application file for complete search history.

(56) References Cited

FOREIGN PATENT DOCUMENTS

| CN | 102517148 A | 6/2012 |
|---|---|---|
| CN | 103665029 A | 3/2014 |

(Continued)

OTHER PUBLICATIONS

Zhou et al., Chinese Journal of Biochemical Pharmaceutics, vol. 22, No. 2, pp. 90-92 (Year: 2001).*

(Continued)

*Primary Examiner* — Deborah D Carr

(57) ABSTRACT

The invention belongs to the technical field of phospholipid processing, in particular to a low-iron hydrous phospholipid and a method for separating low-iron hydrous phospholipids from soybean oil sediments. The main components of low-iron water-containing phospholipids are phospholipids, oil and water; its water content is 70-80 g/100 g; on a dry basis, the content of acetone-insoluble matter is 92.5-95.5 g/100 g; in terms of acetone-insoluble matter, the iron content is less than or equal to 18 mg/kg. The low-iron water-containing phospholipid of the present invention is prepared from soybean oil by a hydration method, and is used to solve the defects of low acetone-insoluble content of the water-containing phospholipid, inability to remove iron ions and the industry's long-term dependence on the solvent method to prepare the powdered phospholipid; At the same time, the method solves the technical problem that "the preparation of powder phospholipid by hydration method cannot realize industrial production".

8 Claims, 3 Drawing Sheets

(56) References Cited

FOREIGN PATENT DOCUMENTS

CN 107325125 A * 11/2017 .............. C07F 9/106
CN 111533765 A 8/2020

OTHER PUBLICATIONS

Jing-Chun Zhou et al., The changing of acid value and iodine value of soybean phospholipids containing soybean pil, water and iron, Chinese Journal of Biochemical Pharmaceutics, Dec. 31, 2001, pp. 90-92, vol. 22, No. 2.
Xing-Zhong Hu, Preparation process of soybean phospholipid concentrate, China Oils and Fats, 2007, pp. 18-21, vol. 32, No. 9.
Qingtao Hu et al., Preparation technology and practice of concentrated phospholipid, China Oils and Fats, 2002, pp. 39-40, vol. 27, No. 1.
National Food Safety Standards of China—Food Additive Phospholipid, National Standards of the People's Republic of China, May 17, 2012, GB-28401-2012.
Ziming Li et al., Separation and Purification of Soybean Phosphatides in Liquid Crystal Phase, Journal of the Chinese Cereals and Oils Association, Jan. 2007, pp. 30-33, vol. 22, No. 1.
Tianguo Rao, Phospholipid composition and properties of soybean oil, Food Processing, 1982, pp. 61-63.
Le Yu et al., Determination of phospholipids composition in crude soybean oil from different sources by nuclear magnetic resonance and comparison of phosphatidic acid content, China Oils and Fats, 2017, pp. 130-133, vol. 42, No. 1.
International Search Report of PCT Patent Application No. PCT/CN2020/135887 issued on Mar. 10, 2021.

\* cited by examiner

LOW IRON HYDROUS PHOSPHOLIPID AND METHOD FOR SEPARATING LOW-IRON HYDROUS PHOSPHOLIPIDS FROM SOYBEAN OIL SEDIMENTS

CROSS-REFERENCE TO RELATED APPLICATION

The present application is a continuation application of PCT patent application No. PCT/CN2020/135887 filed on Dec. 11, 2020, which claims the benefit of Chinese Patent Application Nos. 202010454426.X and 202010455240.6, both filed on May 26, 2020, each of which is incorporated by reference herein in its entirety.

TECHNICAL FIELD

The invention belongs to the technical field of phospholipid processing, in particular to a low-iron hydrous phospholipid and a method for separating low-iron hydrous phospholipids from soybean oil sediments.

BACKGROUND

The raw material for phospholipid processing is soybean oil sediments (also known as "Lecithin gum" or "soybean oil feet" or "soybean oil bottoms"), which is a by-product of the hydration and degumming process in the refining process of soybean oil in the field of oil processing, also known as hydration oil sediments. The main components of soybean oil sediments are phospholipids 30-45 g/100 g, soybean oil 20-30 g/100 g, moisture 30-50 g/100 and some trace components, of which the trace components are metal ions, such as calcium, magnesium and iron. The ions exist in the form of phospholipid metal salts; taking iron ions as an example, in terms of acetone insoluble matter, it is usually 50-100 mg/kg, and in individual cases it is as high as 150 mg/kg or more.

There are two main industrialized phospholipid processing methods.

One method is to prepare concentrated phospholipids by hydration method, that is, after hydrating and extracting soybean oil sediments from soybean crude oil, the concentrated phospholipids are obtained after direct drying and dehydration. Concentrated phospholipids are also called fluid phospholipids because of their fluidity. The content of acetone insolubles on dry basis of concentrated phospholipids is 60-65 g/100 g.

Another method is to prepare powder phospholipids by solvent method, that is, by using soybean oil sediments or concentrated phospholipids as raw materials, and extracting and removing oil with acetone, to obtain powder phospholipids with a dry-base acetone-insoluble content of 95-98 g/100 g.

At present, the main products on the market are concentrated phospholipids, while powder phospholipids account for less than 5% of the market.

Although soybean oil sediments are overwhelmingly processed into concentrated phospholipids, the concentrated phospholipids have major drawbacks.

For example, the journal documents "Preparation Process of Soybean Phospholipid Concentrate" (Hu Xingzhong. Preparation Process of Soybean Phospholipid Concentrate [J]. China Oils and Fats, 2007, 32(9): 20-21) and the journal "Preparation Technology and Practice of Concentrated Phospholipid" (Hu Qingtao et al. Preparation technology and practice of concentrated phospholipid [J]. China Oils and Fats, 2002, 27(1): 39-40) introduced the method of producing concentrated phospholipids by dehydration and oxidative bleaching using hydrated oil sediments as raw materials.

The disadvantage of this process is that the acetone-insoluble content of concentrated phospholipids is too low (60-65 g/100 g), and chemical bleaching is required, and at the same time, its market price is only 40,00 yuan/ton. There is a big difference in price between concentrated phospholipids and powder phospholipids which is 40,000 yuan/ton.

Patent application CN103665029A discloses a method for preparing soybean powder phospholipid. In the method, acetone is used as a solvent to extract the hydrated oil sediments, the acetone insoluble matter is separated, and then the acetone insoluble matter is dried under low temperature vacuum to remove the solvent, and finally the powdered phospholipid is obtained.

The disadvantage of this method is the use of acetone solvent, high production cost, environmental pollution, and solvent residues, which will lead to food safety hazards, and it is difficult to popularize widely. Therefore, this method cannot promote the upgrading of product structure from concentrated phospholipids to powder phospholipids in the field of oil processing, nor can it be improved the current situation of high oil refining loss.

At present, there are many defects in the research of preparing phospholipid by hydration method. For example, patent application CN107325125A discloses a method for preparing hydrated phospholipid from soybean oil sediments and the obtained hydrated phospholipid. The method includes the following operation steps: taking soybean oil sediments and adding softened water, after the water is mixed evenly, it is left to stand for chromatography; after the chromatography, the temperature is controlled at 85-95° C., and centrifugation is performed to obtain hydrated phospholipids, and the acetone-insoluble content can reach 90-92%. The patent has the following defects:

(1) Hydrated Phospholipids have a Low Dry Basis Acetone Insoluble Content.

The patent is a homogeneous hydration method, that is, the oil sediments and water should be mixed evenly, and emulsification will inevitably occur when mixing evenly. If the emulsification is serious, it is difficult to separate the phospholipids and oils.

In order to avoid serious emulsification, the patent takes two measures. First, strictly control the amount of water added, which is 0.25-0.74 times the weight of the oil sediment; second, add sodium hydroxide or sulfuric acid to be used as a demulsifier. The problem brought about by the above measures is that the main components of phospholipids, oils and phospholipid metal salts in soybean oil sediments have not been effectively separated, and the dry acetone-insoluble content of hydrated phospholipids is only up to 92%. Compared with the solvent method, there is still a certain gap.

(2) Cannot be Industrially Applied.

The hydrated phospholipid is concentrated and dehydrated, added with preservatives, pasteurized and packaged to obtain a water-containing phospholipid product with a water content of 22.5-41.2%. However, this product does not meet the national standard "GB28401 Food Additive Phospholipids" that the moisture should not exceed 2%, so it cannot be sold.

If it is dried according to the existing method for preparing powdered phospholipids, the time is too long, the production capacity is too low, there is no feasibility of industrial production, and it cannot be sold or further processed, so that it cannot be industrially applied.

Another prior art of extracting phospholipids by hydration has been published in a journal article "Separation and Purification of Soybean Phosphatides in Liquid Crystal Phase" (Li Ziming et al. Separation and Purification of Soybean Phosphatides in Liquid Crystal Phase [J]. Journal of the Chinese Cereals and Oils Association) Journal, 2007, 22(1).31-32).

This method has the following technical defects:
(1) The dry acetone-insoluble content of the liquid crystal phospholipid is low. the amount of water added is 0.67 times the oil sediments, and the dry acetone-insoluble content of the obtained liquid crystal phospholipid is only 86.05%, by using the homogeneous hydration method, which is the same as the defect of hydrated phospholipid;
(2) It cannot be used industrially. The drying problem of liquid crystal phospholipids is the same as that of hydrated phospholipids.

Although liquid crystal phospholipids can be converted into powder phospholipids by intermittent vacuum drying, the drying time is too long, and the color of the phospholipid products is too dark to be applied to industrial production.

Patent application CN102517148A discloses a two-step decolorization method for phospholipids, which adopts a two-step decolorization method of hydrogen peroxide bleaching and silica gel adsorption.

The disadvantages of this method are:
(1) The use of chemical bleaching and decolorization will cause oxidation by-products of phospholipids, destroy the naturalness of phospholipids, and present food safety risks, which does not conform to the general trend of "green" development.
(2) The effect of silica gel adsorption and decolorization is very poor, and the invalid silica gel becomes waste residue, which is not conducive to environmental protection.
(3) The beneficial antioxidant components in phospholipids are destroyed by bleaching, the antioxidant properties and nutritional value of phospholipids are reduced, and the shelf life is shortened.

At present, the research of metal ions in phospholipids is limited to the detection of content. Soybean oil sediments contains a certain amount of metal ions such as calcium, magnesium and iron, which exist in the form of phospholipid metal salts, referred to as phospholipid salts. Among phospholipid salts, phospholipid iron salts are the most representative.

"Phospholipid composition and properties of soybean oil" (Rao Tianguo. Phospholipid composition and properties of soybean oil [J]. Food Processing, 1982, 2:62) reported that the hydratable phospholipid of soybean crude oil contains 150 mg/kg of iron ions, these iron ions will eventually be transferred to the hydrated oil sediments.

"Determination of phospholipids composition in crude soybean oil from different sources by nuclear magnetic resonance and comparison of phosphatidic acid content" (Yu Le et al. Determination of phospholipids composition in crude soybean oil from different sources by nuclear magnetic resonance and comparison of phosphatidic acid content [J]. China Oils and Fats, 2017, 42 (1): 132) reported: the content of metal ions in soybean crude oil. However, there is no report on how to remove phospholipid iron salts from soybean oil sediments.

In the field of phospholipid processing, from the product point of view, the replacement of concentrated phospholipids with powdered phospholipids is the future direction.

From the method point of view, hydration method instead of solvent method is the future direction.

Although some hydration methods have been studied at present, the purity of the phospholipids prepared by the hydration method is still not high enough, the color improvement has not been separated from the method of chemical bleaching, the dehydration efficiency of the hydration method has not yet reached the level of industrialization, and there are some deficiencies in the integrity and continuity of the process.

Therefore, it is very necessary to develop a low-iron hydrous phospholipid that can solve the above technical problems and a method for separating low-iron hydrous phospholipid from soybean oil sediments.

SUMMARY

The first object of the present invention is to provide a low-iron hydrous phospholipid.

The low-iron water-containing phospholipid of the present invention is prepared from soybean oil by a hydration method, and the method is used to solve the technical problems: the acetone-insoluble content of the water-containing phospholipid is not high, and the iron ions cannot be removed, and the industry has long relied on the solvent method to prepare powder phospholipids.

At the same time, the method also solves the technical problem that the hydration method powder phospholipid cannot be realized in industrialized production.

The application of the low-iron hydrous phospholipid of the present invention is to prepare hydration method powder phospholipid.

The acetone-insoluble content of the low-iron water-containing phospholipid is as high as 92.5-95.5 g/100 g, the color is natural yellow, no bleaching, solvent-free, and can replace the powder phospholipid prepared by the solvent method, thereby avoiding the environmental pollution and food safety hazards of the solvent method.

At the same time, the production cost of powdered phospholipids by the hydration method is much lower than that by the solvent method.

The low-iron hydrous phospholipids have not been reported in the field of phospholipid processing and related research.

The second object of the present invention is to provide a method for separating low-iron water-containing phospholipids and oils from soybean oil sediments.

The present invention solves the defects of low acetone-insoluble content, inability to remove iron ions, inability to recover soybean oil in soybean oil sediments, and long-term dependence of the industry on solvent-based preparation of powdered phospholipids for the water-containing phospholipids prepared by the existing methods.

At the same time, the method is used to solve the technical problem that the hydration method powder phospholipid cannot realize the industrialized production.

The method for separating low-iron water-containing phospholipids and oils from soybean oil sediments has not been reported in the field of phospholipid processing and related research.

The third object of the present invention is to provide the application of the low-iron hydrous phospholipid in the preparation of low-iron powdered phospholipid.

For realizing the above purpose, the technical scheme provided by the invention is as follows:

A low-iron water-containing phospholipid, the main components of the low-iron water-containing phospholipid are phospholipids, oil and water; wherein the water content is 70-80 g/100 g; on a dry basis, the acetone-insoluble content is 92.5-95.5 g/100 g; In terms of acetone insoluble matter, the iron content is less than or equal to 18 mg/kg.

Preferably, the low-iron hydrous phospholipid is a brown translucent fluid.

The present invention also relates to a method for separating low-iron water-containing phospholipids and oils and fats from soybean oil sediments, comprising:

(1) Adding soybean oil sediments into water and soak it to obtain saturated water-absorbing oil sediments;
(2) Centrifugal settling to saturated water-absorbing oil sediments to remove phospholipid metal salts to obtain fluid;
(3) After the fluid is left to stand, the low-iron hydrous phospholipid is obtained from the sediment layer, and the oil is obtained from the upper layer.

Preferably, in step (1), the mass ratio of the soybean oil sediments to water is 1:1-3.5.

When the water is less than 1.0 times the weight of the oil sediments, soybean oil sediments cannot be effectively soaked in water, which affects the combination of phospholipid and water.

When the water is more than 3.5 times the mass of the oil sediments, although it is beneficial to the soaking of the soybean oil sediments, the cost of water, energy consumption and the volume of the equipment are all increased.

Preferably, the soaking temperature is 60-95° C.

During the soaking process, phospholipids can combine with water in water at 0° C. to 100° C., and the higher the temperature, the higher the binding efficiency.

Therefore, increasing the water temperature can shorten the soaking time.

However, in boiling water, it is not conducive to the stability of low-iron hydrous phospholipid, and the boiling and evaporation of water also wastes energy. Therefore, the temperature of the soaking is preferably 60-95° C.

The temperature above 60° C. is the sterilization temperature, which can prevent the oil sediments from deteriorating during soaking, and the temperature below 95° C. can prevent the water from boiling.

Preferably, the soaking time is 1-3 h.

The soaking refers to that soybean oil sediments is a dispersed phase in water, and water is a continuous phase, which constitutes a soaking system.

As a result of the soaking, saturated water-absorbing soybean oil sediments are obtained.

At the end of the soaking, the water absorption of the phospholipids in the saturated water-absorbing oil sediments reaches saturation, and the water content of the phospholipids reaches 70-80 g/100 g at this time.

The soaking time refers to the time required to obtain saturated water-absorbing oil sediments, starting from the soybean oil sediments being granulated and soaking in water, until the brown low-iron hydrous phospholipid begins to appear in the soybean oil sediments.

The soybean oil sediment in soaking is yellow, while the low-iron hydrous phospholipid that appears is brown.

Therefore, it can be visually judged whether the soaking has reached the end time.

During soaking, stirring should not be performed to prevent emulsification.

More preferably, before soaking, the soybean oil sediment is dispersed into granules in water with stirring.

More preferably, the particle size of the soybean oil sediment is less than or equal to 5 mm.

More preferably, the particle size of the soybean oil sediment is 0.3-3 mm.

The smaller the particle size of the oil sediment, the larger the contact area between the oil sediment and the water, which is more conducive to improving the mass transfer and heat transfer efficiency between the phospholipid and the water in the oil sediment.

However, if the particle size of the oil sediments is too small, there is a risk that the oil sediments and water will be mixed evenly and homogenized, which will destroy the soaking system.

Preferably, in step (1), the preparation method of the low-iron water-containing phospholipid further comprises: adding an electrolyte to the soaking system.

More preferably, the mass fraction of the electrolyte in water is 0.01-0.3%.

An appropriate amount of electrolyte is conducive to the combination of phospholipids and water in soybean oil sediments. Too much electrolyte will inhibit the combination of phospholipids and water. Too little or no electrolyte will result in high water content of low-iron phospholipids, which will cause energy waste during dehydration.

More preferably, the electrolyte includes at least one of acid, base or salt.

More preferably, the electrolyte is at least one of the following components: DL-sodium malic acid, L-malic acid, DL-malic acid, glacial acetic acid, citric acid, potassium citrate, sodium citrate, mono-citric acid Sodium, sodium gluconate, lactic acid, potassium lactate, sodium lactate, potassium carbonate, sodium carbonate, potassium bicarbonate, sodium bicarbonate, sodium sulfate, potassium chloride, potassium hydroxide, sodium hydroxide, hydrochloric acid, phosphoric acid, sodium chloride.

Preferably, in step (2), the centrifugal sedimentation is intermittent centrifugal sedimentation.

The intermittent centrifugal sedimentation means that loading and unloading must be carried out during shutdown state.

The continuous centrifuge cannot be used in this step, which will cause serious emulsification of the material during feeding and discharging, and cannot achieve the expected separation effect.

Since the fluids obtained from saturated water absorption oil sediments and centrifugal sedimentation are all fluids with excellent fluidity and can be automatically loaded and unloaded, the operation of batch centrifuges can be automated through program design to meet large-scale industrial production.

In the process of centrifugal sedimentation, the saturated water-absorbing oil sediment is divided into two components: slag and fluid in the batch centrifuge. Among them, the slag is mainly phospholipid metal salt, which sticks to the wall of the centrifuge drum in the form of slag, and the slag should be taken out from the upper part of the centrifuge by means of slag discharge. The fluids are mainly oil, water and low-iron phospholipids, which are called fluids because they can flow. After shutdown, the fluid can automatically flow into the static layering tank from the sediment of the centrifuge, and the oil, water and low-iron hydrous phospholipid in the fluid are automatically divided into three layers due to the difference in specific gravity.

Preferably, the temperature of the centrifugal sedimentation is 60-95° C.

Preferably, the rotational speed of the centrifugal sedimentation is 500-2000 rpm.

Preferably, the centrifugal sedimentation time is 5-15 min.

Preferably, in step (3), the temperature of the static layering is 60-95° C.

The present invention also relates to the application of the low-iron hydrous phospholipid in the preparation of low-iron powdered phospholipid.

Preferably, the preparation of low-iron powdered phospholipids by using low-iron hydrous phospholipids includes the following steps:

(1) Preparation of Concentrated Hydrous Phospholipids.

The low-iron hydrous phospholipid is concentrated to a water content of 25-65 g/100 g at 90-110° C. under vacuum to obtain a concentrated hydrous phospholipid.

The dry acetone insoluble content of the concentrated hydrous phospholipid is 92.5-95.5 g/100 g. In terms of acetone insoluble matter, the iron content is 518 mg/kg, and the sensory index is brown translucent fluid.

(2) Preparation of Hydrous Phospholipid Elastomer.

The concentrated hydrous phospholipid is pushed into the stirrer at a speed of 10-100 cm/min, the stirring revolution is 800-1200 rpm, and the stirring time is 5-30 s, so as to obtain a continuously output water-containing phospholipid elastomer. The water content and acetone-insoluble content of the water-containing phospholipid elastomer are the same as those of the concentrated water-containing phospholipid, but the sensory indicators change to yellow opaque semi-solid.

(3) Preparation of Solid Phospholipids.

The continuously output water-containing phospholipid elastomer is fed into a normal pressure or vacuum continuous dryer through a feed port with a pore diameter of 2-6 mm, and dried at 120-160° C. for 6-20 min to obtain a continuous output strip-shaped solid phospholipid. The water content of solid phospholipid is 3-10 g/100 g, the content of acetone insoluble matter on dry basis is 92.5-95.5 g/100 g, and the sensory index is yellow strip solid.

(4) Preparation of Low Iron Powder Phospholipids.

The strip-shaped solid phospholipids are crushed, sieved, and dried under vacuum at 60° C. for 30-60 min to obtain low-iron powder phospholipids. The low-iron powder phospholipid has a water content of ≤2 g/100 g, and a dry-base acetone-insoluble content of 92.5-95.5 g/100 g; in terms of acetone-insoluble matter, the iron content is ≤8 mg/kg, and the sensory index is yellow powder.

The national standard of the product is "GB28401 Food Additive Phospholipids".

The water content of the powdered phospholipid in step (4) is equivalent to the drying weight loss described in the national standard "GB28401 Food Additive Phospholipids".

The vacuum is 0.01-0.004 MPa.

The significance of removing phospholipid metal salts as follows:

First, the phospholipid metal salt reduces the acetone-insoluble content of the water-containing phospholipid, and the phospholipid metal salt separated from the oil sediments by the hydration method has a dry oil content of 40%.

If the phospholipid metal salt remains in the water-containing phospholipid, the acetone-insoluble content of the water-containing phospholipid will be reduced, which is one of the reasons for the low acetone-insoluble content of the liquid-crystalline phospholipid in the patent CN107325125A and the document "Separation and Purification of Soybean Phosphatides in Liquid Crystal Phase".

Second, phospholipid metal salts lead to reduced shelf life of phospholipid products. Metal ions play a catalytic role in the oxidation of phospholipids. The phospholipid metal salts separated from the oil sediments will be oxidized and deteriorated within 30 days. Phospholipid products contain phospholipid metal salts, which can reduce the shelf life of phospholipid products.

Third, Phospholipid metal salts have no emulsifying properties. The main use of phospholipids is as an emulsifier for the preparation of medicines, food and other products. Phospholipid metal salts not only have no emulsifying properties themselves, but also interfere with the emulsifying properties of normal phospholipids, causing normal phospholipid aggregation to lose emulsifying properties.

Fourth, phospholipid iron salts are dark red substances. If the phospholipid product contains more phospholipid iron salt, the color of the product will become darker and darker. The traditional method relies on chemical bleaching and decolorization, which leads to adverse consequences such as reduced food safety, reduced shelf life, and damage to the naturalness of phospholipids.

Compared with hydration method low iron powder phospholipid, the main defects of solvent method powder phospholipid are as follows:

First, the use of organic solvent acetone has environmental pollution, potential food safety hazards caused by solvent residues, and high production costs.

Second, the solvent method also removes natural plant colors such as lutein in phospholipids when extracting and removing oils, which not only reduces the nutritional value of phospholipids, but also loses the antioxidant protection of natural plant pigments and shortens the shelf life of phospholipids.

Third, the solvent method cannot reduce the content of iron ions in phospholipids, and cannot improve the color of phospholipids because phospholipid iron salts are dark red, nor can they improve the antioxidant properties of phospholipids, because iron ions have a catalytic effect on the oxidation of phospholipids.

The beneficial effects of the present invention are as follows:

First, the acetone-insoluble content of the low-iron water-containing phospholipid of the present invention is the highest among all hydration methods at present. The dry acetone-insoluble content of the low-iron hydrated phospholipid of the present invention is 92.5-95.5 g/100 g, while the hydrated phospholipid disclosed in the patent is 90-92 g/100 g, and the liquid-crystalline phospholipid reported in the literature is 86.05 g/100 g.

The water content of the low-iron water-containing phospholipid of the present invention reaches 70-80 g/100 g, and the water absorption of the phospholipid reaches saturation.

When the water absorption of phospholipids reaches saturation, the lipophilicity of phospholipids is reduced to the minimum, that is, the oil content of low-iron water-containing phospholipids is the smallest, and the purity of phospholipids is the highest.

Second, the acetone-insoluble content of the low-iron water-containing phospholipid of the present invention is most similar to the solvent method. The dry acetone-insoluble content of the low-iron water-containing phospholipid of the present invention is 92.5-95.5 g/100 g, which has approached or even reached the level of 95-98 g/100 g of the solvent-based powder phospholipid.

From the perspective of industry development, the hydration method will eventually replace the solvent method and become the mainstream product to eliminate environmental pollution caused by organic solvents and food safety hazards caused by solvent residues, while reducing production costs.

The present invention is the most suitable product for replacing the solvent method at present.

Third, the low-iron water-containing phospholipid of the present invention is the only product capable of removing phospholipid metal salts, including phospholipid iron salts, in all hydration methods and solvent methods.

Whether it is the hydrated phospholipid disclosed in the patent and the liquid crystal phospholipid reported in the literature, or the powder phospholipid by the solvent extraction method in the prior art, the phospholipid metal salt cannot be removed, so these products have defects in color, shelf life, emulsifying property, etc.

Clearly, the low-iron hydrous phospholipid of the present invention eliminates these drawbacks.

Fourth, the low-iron water-containing phospholipids of the present invention and the low-iron powdered phospholipids prepared therefrom have a complete process technology from soybean oil sediments to powdered phospholipids, and have great advantages in terms of quality, shelf life, production cost, environmental protection and food safety, suitable for industrial production.

DESCRIPTION OF THE EMBODIMENTS

The content of the present invention will be further described below with reference to the accompanying drawings. The experimental methods described in the following examples are conventional methods unless otherwise specified; the reagents and materials can be obtained from commercial sources unless otherwise specified.

The vacuum is 0.01-0.004 MPa.

The definition of the dry acetone insoluble yield of low-iron hydrous phospholipids is: dry base acetone insoluble yield of low-iron hydrous phospholipids=dry base acetone insoluble weight of low iron hydrous phospholipids/soybean oil sediment dry base acetone insoluble weight.

The definition of iron removal rate in low-iron hydrous phospholipids is: iron removal rate of low-iron hydrous phospholipids=(iron weight in soybean oil sediments−iron weight in low-iron hydrous phospholipids)/iron weight in soybean oil sediments.

The definition of oil extraction rate is: oil extraction rate=dry basis weight of obtained oil/((1-soybean oil sediment dry basis acetone insoluble content)×soybean oil sediment dry basis weight)

Example 1

Figure 1:
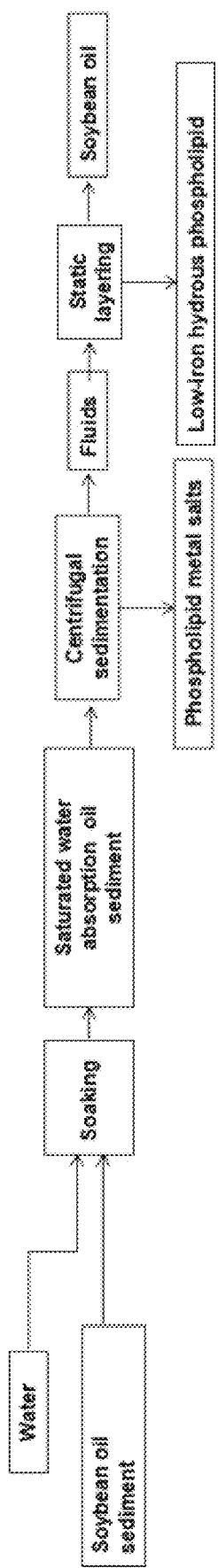
FIG. 1 is a process flow diagram of soybean oil sediment soaking, centrifugal sedimentation and static stratification to obtain low-iron water-containing phospholipids and oils.
Figure 2:
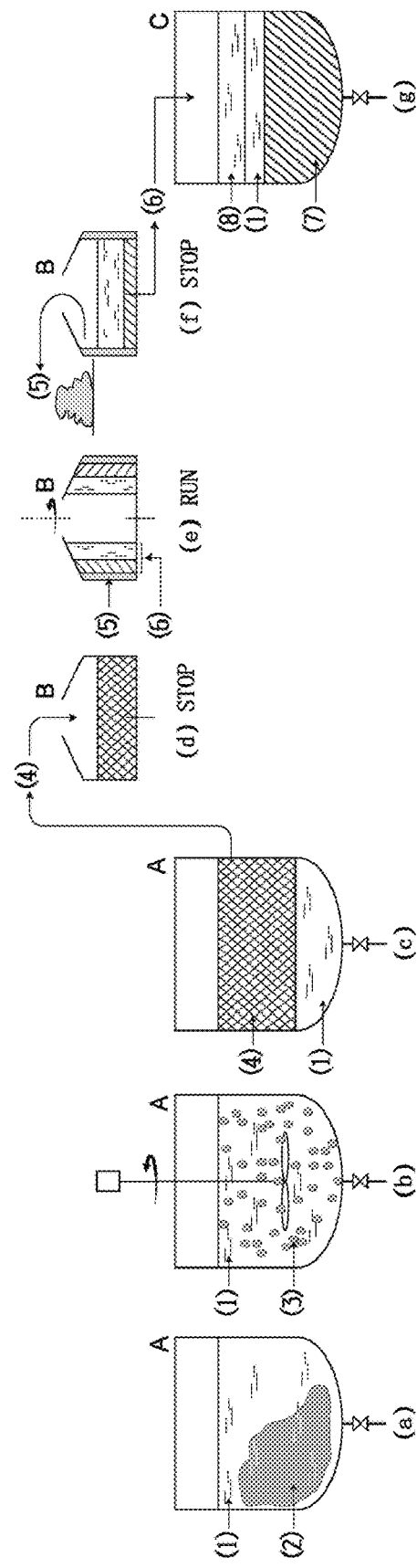
FIG. 2 is the process schematic diagram that soybean oil sediment obtains low-iron water-containing phospholipid and oil through soaking, centrifugal sedimentation and standing and stratification; wherein:
(a) Schematic diagram of soybean oil sediments in water.
(b) Schematic diagram of the soaking system with soybean oil sediment particles as the dispersed phase and water as the continuous phase
(c) Schematic diagram of saturated water absorbing oil sediment;
(d) Schematic diagram of batch centrifuge shutdown and charging;
(e) Schematic diagram of batch centrifuge in operation;
(f) Schematic diagram of batch centrifuge shutdown and unloading;
(g) A schematic diagram of the fluid being left and stratified in a static stratification tank to obtain low-iron water-containing phospholipids and oils.

A method for separating low-iron water-containing phospholipids and oils and fats from soybean oil sediments, the preparation process of which is shown in FIG. 1 and FIG. 2, comprises the following steps:
(1) Soaking: Take soybean oil sediment and add it to water, and disperse the oil sediment in the water into granules by stirring to form a soaking system with oil sediment particles as the dispersed phase and water as the continuous phase.

The soaking temperature is 60° C., and the soaking time is 3 h to obtain saturated water-absorbing oil sediments.

The obtained saturated water-absorbing oil sediment is prepared when brown low-iron hydrous phospholipid appeared.

The oil sediment comes from COFCO Donghai Grain and Oil Industry (Zhangjiagang) Co., Ltd., and its material composition is as follows: water content is 38.12 g/100 g, acetone-insoluble content on a dry basis is 61.47 g/100 g, and iron content in terms of acetone-insoluble matter is 50.13 mg/kg; the water is drinking water; the mass ratio of oil sediments to water is 1:1; the particle size of the oil sediments particles is 0.3-3 mm.
(2) Centrifugal sedimentation: centrifugal sedimentation of saturated water-absorbing oil sediments, the phospholipid metal salt is separated out in the form of slag, and the obtained fluid is obtained. In this process, the rotation speed of centrifugation is 500 rpm, the time is 15 min, and the temperature of centrifugal sedimentation is the same as that of soaking.
(3) Standing for stratification: the obtained fluid is stratified by standing to obtain low-iron hydrous phospholipid and oil, and the temperature for standing and stratification is the same as the soaking temperature.

The water content of the obtained low-iron water-containing phospholipid is 78.12 g/100 g, and the content of acetone-insoluble matter on a dry basis is 94.48 g/100 g. The iron content is 5.51 mg/kg in terms of acetone insoluble matter. The sensory indicators are brown translucent fluid, the dry base acetone insoluble yield of low-iron water-containing phospholipids is 96.48%, the iron removal rate is 89.40%, and the oil extraction rate is 75.92%.

Example 2

A method for separating low-iron water-containing phospholipids and oils and fats from soybean oil sediments, the preparation process of which is shown in FIG. 1 and FIG. 2, comprises the following steps:

(1) Soaking: Take soybean oil sediment and add it to water, and disperse the oil sediment in the water into granules by stirring to form a soaking system with oil sediment particles as the dispersed phase and water as the continuous phase.

The soaking temperature is 70° C., and the soaking time is 3 h to obtain saturated water-absorbing oil sediments.

The obtained saturated water-absorbing oil sediment is marked by the appearance of brown low-iron hydrous phospholipid.

The oil sediment comes from COFCO Donghai Grain and Oil Industry (Shandong) Co., Ltd., and its material composition is as follows: water content is 38.57 g/100 g, acetone-insoluble content on a dry basis is 63.61 g/100 g, and iron content in terms of acetone-insoluble matter is 63.45 mg/kg; the water is drinking water containing 0.07% sodium chloride. The mass ratio of oil sediments to water is 1:1.5; the particle size of the oil sediments particles is 0.3-3 mm.

(2) Centrifugal sedimentation: centrifugal sedimentation of saturated water-absorbing oil sediments, the phospholipid metal salt is separated out in the form of slag, and the obtained fluid is obtained. In this process, the rotation speed of centrifugation is 2000 rpm, the time is 5 min, and the temperature of centrifugal sedimentation is the same as that of soaking.

(3) Standing for stratification: the obtained fluid is stratified by standing to obtain low-iron hydrous phospholipid and oil, and the temperature for standing and stratification is the same as the soaking temperature.

The water content of the obtained low-iron water-containing phospholipid is 74.32 g/100 g, and the content of acetone-insoluble matter on a dry basis is 93.98 g/100 g. The iron content is 7.62 mg/kg in terms of acetone insoluble matter. The sensory indicators are brown translucent fluid, the dry base acetone insoluble yield of low-iron water-containing phospholipids is 95.59%, the iron removal rate is 88.52%, and the oil extraction rate is 74.68%.

Example 3

A method for separating low-iron water-containing phospholipids and oils and fats from soybean oil sediments, the preparation process of which is shown in FIG. 1 and FIG. 2, comprises the following steps:

(1) Soaking: Take soybean oil sediment and add it to water, and disperse the oil sediment in the water into granules by stirring to form a soaking system with oil sediment particles as the dispersed phase and water as the continuous phase.

The soaking temperature is 80° C., and the soaking time is 2 h to obtain saturated water-absorbing oil sediments.

The obtained saturated water-absorbing oil sediment is marked by the appearance of brown low-iron hydrous phospholipid.

The oil sediment comes from COFCO Donghai Grain and Oil Industry (Jiangsu) Co., Ltd., and its material composition is as follows: water content is 39.85 g/100 g, acetone-insoluble content on a dry basis is 62.23 g/100 g, and iron content in terms of acetone-insoluble matter is 75.07 mg/kg; the water is drinking water;

Lactic acid with a concentration of 80% is added to the water, and the addition amount is 0.05% of the weight of drinking purified water;

The mass ratio of oil sediments to water is 1:2; the particle size of the oil sediments particles is 0.3-3 mm.

(2) Centrifugal sedimentation: centrifugal sedimentation of saturated water-absorbing oil sediments, the phospholipid metal salt is separated out in the form of slag, and the obtained fluid is obtained. In this process, the rotation speed of centrifugation is 500 rpm, the time is 15 min, and the temperature of centrifugal sedimentation is the same as that of soaking.

(3) Standing for stratification: the obtained fluid is stratified by standing to obtain low-iron hydrous phospholipid and oil, and the temperature for standing and stratification is the same as the soaking temperature.

The water content of the obtained low-iron water-containing phospholipid is 73.88 g/100 g, and the content of acetone-insoluble matter on a dry basis is 93.69 g/100 g. The iron content is 9.78 mg/kg in terms of acetone insoluble matter. The sensory indicators are brown translucent fluid, the dry base acetone insoluble yield of low-iron water-containing phospholipids is 94.48%, the iron removal rate is 87.69%, and the oil extraction rate is 73.89%.

Example 4

A method for separating low-iron water-containing phospholipids and oils and fats from soybean oil sediments, the preparation process of which is shown in FIG. 1 and FIG. 2, comprises the following steps:

(1) Soaking: Take soybean oil sediment and add it to water, and disperse the oil sediment in the water into granules by stirring to form a soaking system with oil sediment particles as the dispersed phase and water as the continuous phase.

The soaking temperature is 90° C., and the soaking time is 2 h to obtain saturated water-absorbing oil sediments.

The obtained saturated water-absorbing oil sediment is marked by the appearance of brown low-iron hydrous phospholipid.

The oil sediment comes from COFCO Donghai Grain and Oil Industry (Chaohu) Co., Ltd., and its material composition is as follows: water content is 37.68 g/100 g, acetone-insoluble content on a dry basis is 62.58 g/100 g, and iron content in terms of acetone-insoluble matter is 78.08 mg/kg; the water is drinking water;

Sodium hydroxide is added to the water, and the addition amount is 0.05% of the weight of drinking purified water;

The mass ratio of oil sediments to water is 1:2.5; the particle size of the oil sediments particles is 0.3-3 mm.

(2) Centrifugal sedimentation: centrifugal sedimentation of saturated water-absorbing oil sediments, the phospholipid metal salt is separated out in the form of slag, and the obtained fluid is obtained. In this process, the rotation speed of centrifugation is 2000 rpm, the time is 5 min, and the temperature of centrifugal sedimentation is the same as that of soaking.

(3) Standing for stratification: the obtained fluid is stratified by standing to obtain low-iron hydrous phospholipid and oil, and the temperature for standing and stratification is the same as the soaking temperature.

The water content of the obtained low-iron water-containing phospholipid is 78.33 g/100 g and the content of acetone-insoluble matter on a dry basis is 95.41 g/100 g. The iron content is 10.98 mg/kg in terms of acetone insoluble matter. The sensory indicators are brown translucent fluid, the dry base acetone insoluble yield of low-iron water-containing phospholipids is 93.15%, the iron removal rate is 86.90%, and the oil extraction rate is 73.05%.

Example 5

A method for separating low-iron water-containing phospholipids and oils and fats from soybean oil sediments, the preparation process of which is shown in FIG. 1 and FIG. 2, comprises the following steps:
(1) Soaking. Take soybean oil sediment and add it to water, and disperse the oil sediment in the water into granules by stirring to form a soaking system with oil sediment particles as the dispersed phase and water as the continuous phase.

The soaking temperature is 95° C., and the soaking time is 1 h to obtain saturated water-absorbing oil sediments.

The obtained saturated water-absorbing oil sediment is marked by the appearance of brown low-iron hydrous phospholipid.

The oil sediment comes from Louis Dreyfus (Bazhou) Feed Protein Co., Ltd., and its material composition is as follows: water content is 37.99 g/100 g, acetone-insoluble content on a dry basis is 63.08 g/100 g, and iron content in terms of acetone-insoluble matter is 96.23 mg/kg; the water is drinking water;

Citric acid and sodium chloride are added to the water, and the amount of citric acid added is 0.028% of the water, and the amount of salt added is 0.052% of the water;

The mass ratio of oil sediments to water is 1:3; the particle size of the oil sediments particles is 0.3-3 mm.
(2) Centrifugal sedimentation: centrifugal sedimentation of saturated water-absorbing oil sediments, the phospholipid metal salt is separated out in the form of slag, and the obtained fluid is obtained. In this process, the rotation speed of centrifugation is 1000 rpm, the time is 10 min, and the temperature of centrifugal sedimentation is the same as that of soaking.
(3) Standing for stratification: the obtained fluid is stratified by standing to obtain low-iron hydrous phospholipid and oil, and the temperature for standing and stratification is the same as the soaking temperature.

The water content of the obtained low-iron water-containing phospholipid is 73.02 g/100 g and the content of acetone-insoluble matter on a dry basis is 92.50 g/100 g. The iron content is 13.48 mg/kg in terms of acetone insoluble matter. The sensory indicators are brown translucent fluid, the dry base acetone insoluble yield of low-iron water-containing phospholipids is 92.65%, the iron removal rate is 87.02%, and the oil extraction rate is 70.23%.

Example 6

A method for separating low-iron water-containing phospholipids and oils and fats from soybean oil sediments, the preparation process of which is shown in FIG. 1 and FIG. 2, comprises the following steps:
(1) Soaking: Take soybean oil sediment and add it to water, and disperse the oil sediment in the water into granules by stirring to form a soaking system with oil sediment particles as the dispersed phase and water as the continuous phase.

The soaking temperature is 95° C., and the soaking time is 1 h to obtain saturated water-absorbing oil sediments.

The obtained saturated water-absorbing oil sediment is marked by the appearance of brown low-iron hydrous phospholipid.

The oil sediment comes from Qinhuangdao Jinhai Grain and Oil Industry Co., Ltd., and its material composition is as follows: water content is 40.43 g/100 g, acetone-insoluble content on a dry basis is 60.89 g/100 g, and iron content in terms of acetone-insoluble matter is 98.59 mg/kg; the water is drinking water;

Citric acid is added to the water, and the amount of citric acid added is 0.038% of the water;

The mass ratio of oil sediments to water is 1:3.5; the particle size of the oil sediments particles is 0.3-3 mm.
(2) Centrifugal sedimentation: centrifugal sedimentation of saturated water-absorbing oil sediments, the phospholipid metal salt is separated out in the form of slag, and the obtained fluid is obtained. In this process, the rotation speed of centrifugation is 1500 rpm, the time is 5 min, and the temperature of centrifugal sedimentation is the same as that of soaking.
(3) Standing for stratification: the obtained fluid is stratified by standing to obtain low-iron hydrous phospholipid and oil, and the temperature for standing and stratification is the same as the soaking temperature.

The water content of the obtained low-iron water-containing phospholipid is 73.38 g/100 g and the content of acetone-insoluble matter on a dry basis is 93.56 g/100 g. The iron content is 13.52 mg/kg in terms of acetone insoluble matter. The sensory indicators are brown translucent fluid, the dry base acetone insoluble yield of low-iron water-containing phospholipids is 92.03%, the iron removal rate is 87.38%, and the oil extraction rate is 70.01%.

Comparative Example 1

A method for preparing hydrated phospholipids from soybean oil sediments, which is derived from a method for preparing hydrated phospholipids from soybean oil sediments disclosed in patent CN107325125A, comprising the following steps:

0.53 times of drinking purified water and 0.03% of sulfuric acid are added to soybean oil sediments, mixed well, and the mixture is heated to 85° C. and kept for 6 hours. Then, centrifuge at 85° C. and 4500 r/min for 5 min to obtain hydrated phospholipids.

The soybean oil sediment is produced by COFCO Huanghai Cereals and Oils Industry (Shandong) Co., Ltd., and its water content is 38.57 g/100 g, the dry acetone-insoluble content is 63.61 g/100 g, and the iron content in terms of acetone-insoluble matter is 63.45 mg/kg.

The water content of the obtained hydrated phospholipid is 64.19 g/100 g, the content of acetone-insoluble matter on a dry basis is 90.12 g/100 g, the iron content is 63.45 mg/kg in terms of acetone-insoluble matter, and the sensory index is a brown translucent fluid.

The main difference between the present invention and the hydrated phospholipid prepared in Comparative Example 1 includes the following aspects:

The main difference between the hydrated phospholipid prepared by the present invention and the hydrated phospholipid prepared by Comparative Example 1 includes the following aspects:

First, the hydration method and the water content of the phospholipids are different. Hydrated phospholipids are prepared by a homogeneous hydration method, in which soybean oil sediments and water need to be mixed evenly, and the amount of water added in the hydration operation is 0.25-0.74 times the weight of the oil sediments. Too much water will cause emulsification. Therefore, the water absorption of hydrated phospholipids is far from saturated, and the water content of phospholipids is only 64.19 g/100 g.

The low-iron water-containing phospholipid prepared by the present invention is prepared by soaking and hydration method. In the method, soybean oil sediments are in a granular state as a dispersed phase and water is a continuous phase to form a soaking system. In this process, the amount of water added is 1.0-3.5 times the weight of the oil sediment. The phospholipids are saturated with excess free water in the surrounding, with a phospholipid saturation value of 70-80 g/100 g.

Only when the water content of phospholipids reaches saturation, the acetone-insoluble content of phospholipids can reach the maximum value of 92.5-95.5 g/100 g.

The water absorption of phospholipids to achieve saturation has the following effects, one is that the acetone-insoluble content of the phospholipids is the highest; the other is that the metal salts of the phospholipids are separated; The third is to facilitate the separation of phospholipids, phospholipid metal salts and oils in oil sediments.

Second, the phospholipid purity is different. The acetone-insoluble content of the hydrated phospholipids is 90-92 g/100 g on a dry basis, and the phospholipid metal salts cannot be removed.

In the patent for hydrated phospholipids, by bleaching and decolorizing with hydrogen peroxide, the natural nature of phospholipids is destroyed, and the shelf life and food safety cannot be guaranteed.

The dry acetone-insoluble content of the low-iron water-containing phospholipid of the invention is 92.5-95.5 g/100 g, the low-iron water-containing phospholipid can remove the phospholipid metal salt which is a dark red substance, and the removal of the phospholipid metal salt is conducive to the preparation of yellow powdered phospholipids.

The powder phospholipid prepared by the low-iron water-containing phospholipid of the present invention is naturally yellow, and does not need chemical bleaching.

Comparative Example 2

A method for preparing liquid crystal phospholipid from soybean oil sediment, which is derived from the document "Separation and Purification of Soybean Phosphatides in Liquid Crystal Phase", comprising the following steps:

0.67 times of purified drinking water and soybean oil are mixed evenly, the mixture is heated to 70° C., kept for 4 hours, and then centrifuged at 70° C. and 4500 r/min for 5 minutes to obtain liquid crystal phospholipids.

The soybean oil sediment is produced by Qinhuangdao Jinhai Grain and Oil Industry Co., Ltd., and its water content is 40.43 g/100 g, the dry acetone-insoluble content is 60.89 g/100 g, and the iron content in terms of acetone-insoluble matter is 98.59 mg/kg.

The water content of the obtained hydrated phospholipid is 64.08 g/100 g, the content of acetone-insoluble matter on a dry basis is 86.06 g/100 g, the iron content is 98.59 mg/kg in terms of acetone-insoluble matter, and the sensory index is a brown translucent fluid.

The liquid crystalline phospholipid is passed through a circular feed port with a pore diameter of 2 mm, and is placed on a drying tray according to the same strip shape and density as in Example 1, and dried in an intermittent vacuum drying oven at 65° C. for 240 min to obtain a brown block solid phospholipid. The water content of solid phospholipid is 6.79 g/100 g, and the content of acetone-insoluble matter on a dry basis is 86.06 g/100 g. The brown solid phospholipid is pulverized, passed through an 18-mesh sieve, and dried in a vacuum drying oven at 60° C. for 30 min to obtain powdered phospholipid. The water content of powder phospholipids is 1.38 g/100 g, the content of acetone-insoluble matter on a dry basis is 86.06%, and the iron content in terms of acetone-insoluble matter is 98.59 mg/kg, and the sensory index is brown powder.

Comparing the product of the present invention and the liquid crystal phospholipid of Comparative Example 2, it is found that the differences mainly include the following aspects:

First, Liquid crystal phospholipids are prepared by homogeneous hydration method. Soybean oil sediments and water need to be mixed evenly, and the amount of water added is 0.67 times the weight of the oil sediments. Therefore, the water absorption of liquid crystal phospholipids is far from saturated, and the water content is only 64.08 g/100 g. The defects are exactly the same as the patented hydrated phospholipids.

The low-iron water-containing phospholipid prepared by the present invention is prepared by soaking and hydration method. In the method, soybean oil sediments are in a granular state as a dispersed phase and water is a continuous phase to form a soaking system. In this process, the amount of water added is 1.0-3.5 times the weight of the oil sediment. The phospholipids are saturated with excess free water in the surrounding, with a phospholipid saturation value of 70-80 g/100 g.

Second, the phospholipid purity is different. The dry acetone-insoluble content of the liquid crystal phospholipids is 86.06 g/100 g, and the phospholipid metal salts could not be removed. The solid phospholipids prepared by drying are light brown, and the powder phospholipids are dark brown.

The acetone-insoluble content on a dry basis of the low-iron water-containing phospholipid of the present invention is 92.5-95.5 g/100 g, and the phospholipid metal salt can be removed, and the content of the acetone-insoluble matter on a dry basis is quite different. Both the solid phospholipid and the powder phospholipid prepared from the low-iron water-containing phospholipid of the present invention are yellow.

Comparative Example 3

A preparation method of powdered soybean lecithin, which is derived from patent CN103665029A preparation method of powdered soybean lecithin, comprising the following steps:

(1) Soybean oil sediments and anhydrous acetone are mixed at a weight ratio of 1:10, stirred and extracted under normal pressure and room temperature for 20 minutes, then centrifuged 1 minute with 4000 rpm centrifugal speed for solid-liquid separation, and the solid part is collected.

The soybean oil sediment comes from Qinhuangdao Jinhai Grain and Oil Industry Co., Ltd., and its material composition is as follows: water content is 40.43 g/100 g, acetone-insoluble content on a dry basis is 60.89 g/100 g, and iron content in terms of acetone-insoluble matter is 98.59 mg/kg.

(2) The solid part obtained in step (1) is mixed with anhydrous acetone at a weight ratio of 1:10, stirred and extracted under normal pressure and room temperature for 20 min, and then centrifuged 1 minute with 5000 rpm centrifugal speed for solid-liquid separation.

The solid part is crushed and dried under vacuum at 60° C. for 5 hours to obtain soybean powder phospholipid.

The dry acetone-insoluble content of the powdered phospholipid is 95.58 g/100 g, the iron content is 98.59 mg/kg in terms of acetone-insoluble matter, the drying reduction is 0.54 g/100 g, and the color is brown.

Comparing the product of the present invention and the powder phospholipid of Comparative Example 3, it is found that the differences mainly include the following aspects:

First, the difference between environmental protection and food safety:

In Comparative Example 3, a method for preparing powdered phospholipid by a solvent method is provided, in which solvent volatilization will cause pollution to the environment. At the same time, the residual solvent has a potential food safety hazard.

The method for preparing the powdered phospholipid by the product of the present invention belongs to the hydration method, and there is no environmental pollution. The drying reduction of the product is less than or equal to 2 g/100 g, and the drying reduction component is water, and there is no food safety hazard.

Second, the color is different. The powdered phospholipids prepared in Comparative Example 3 could not be freed from phospholipid metal salts. In order to reduce the residual amount of solvent, the drying time of powdered phospholipids during the preparation process is longer, and the color of the product is darker.

However, when the powder phospholipid is prepared by using the low-iron hydrous phospholipid of the present invention, the drying time is short, the metal salt of the phospholipid can be removed, and the color of the phospholipid is natural yellow.

Application 1

The low-iron hydrous phospholipids prepared in Example 4 are used in the preparation of solid phospholipids and powdered phospholipids.

Figure 3:
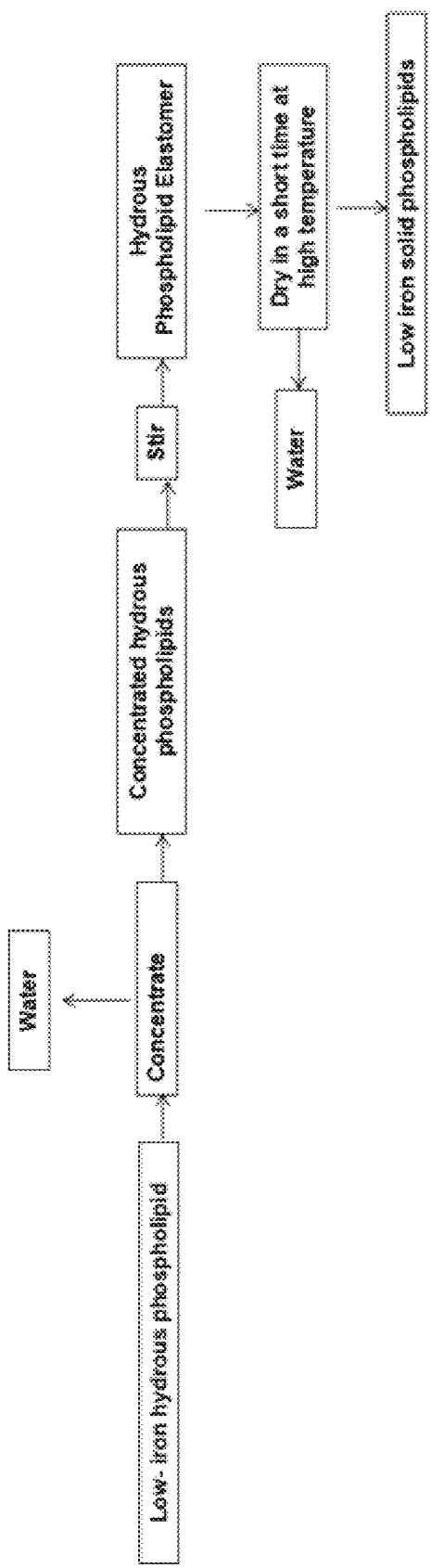
FIG. 3 is the process flow chart for preparing low-iron solid phospholipids from low-iron hydrous phospholipids.
Figure 4:
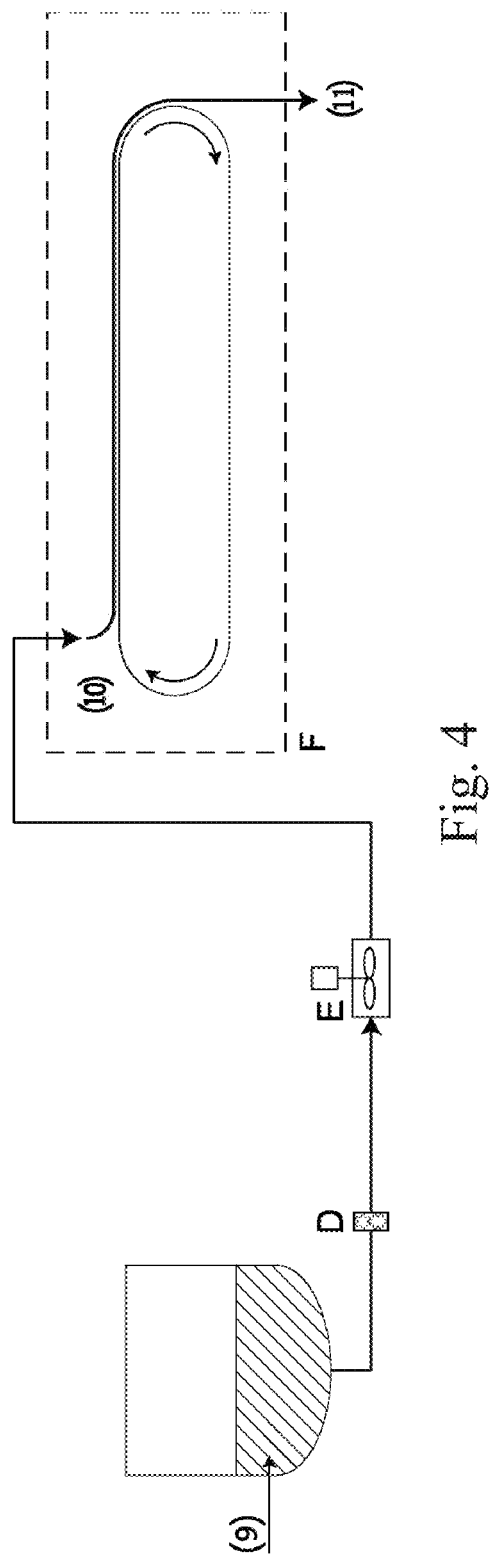
FIG. 4 is the process schematic diagram of preparing solid phospholipid by concentrating water-containing phospholipid; wherein:
(1) is continuous phase water; (2) is soybean oil sediments; (3) is dispersed phase soybean oil sediments particles; (4) is saturated water-absorbing oil sediments; (5) is slag, ie, phospholipid metal salts (6) is a fluid, that is a mixture of oil, low-iron hydrous phospholipid and water; (7) is low-iron hydrous phospholipid; (8) is oil; (9) is concentrated hydrous phospholipid; (10) is hydrous phospholipid elastic body; (11) is a low-iron solid phospholipid. A is a soaking tank; B is a batch centrifuge; C is a static layering tank; D is a speed-regulating gear pump; E is a pipeline agitator; F is a continuous dryer.

The preparation process for preparing solid phospholipids and low-iron powder phospholipids with low-iron hydrous phospholipids is shown in FIG. 3 and FIG. 4, including the following steps:
(1) Concentrating the low-iron hydrous phospholipid prepared in Example 2 to obtain a concentrated hydrous phospholipid;
(2) Stirring the concentrated hydrous phospholipid to obtain a hydrous phospholipid elastomer;
(3) Drying the water-containing phospholipid elastomer to obtain a bar-shaped solid phospholipid;
(4) Pulverizing, sieving and drying the strip-shaped solid phospholipids to obtain powdered phospholipids.

In step (1), the low-iron water-containing phospholipid of Example 2 is concentrated to 55 g/100 g in a vacuum thin-film evaporator at 95° C. to obtain a concentrated water-containing phospholipid with a dry-base acetone-insoluble content of 93.98 g/100 g, 7.62 mg/kg iron content in terms of acetone insoluble matter, and brown translucent fluid.

In step (2), the concentrated hydrous phospholipid of step (1) is pushed into the mixer at a speed of 80 cm/min, the stirring revolution is 900 rpm, and the stirring time is 10 s to obtain a continuous output hydrous phospholipid elastomer.

The water content and acetone insoluble content of the water-containing phospholipid elastomer are the same as those of the concentrated water-containing phospholipid, but the sensory indicators changed to yellow opaque semi-solid.

In step (3), the water-containing phospholipid elastomer continuously output in step (2) is fed into a continuous atmospheric pressure dryer through a set of feed ports with a pore diameter of 3 mm, and dried at 150° C. for 8 minutes to obtain continuous output strip solids phospholipids. The water content of the strip-shaped solid phospholipid is 7.33 g/100 g, the content of acetone-insoluble matter on a dry basis is 93.98 g/100 g, and the sensory index is a yellow strip-shaped solid.

In step (4), the solid phospholipids in strips of step (3) are pulverized, passed through an 18-mesh sieve, and dried in a double-cone cyclotron vacuum dryer at 60° C. for 40 min to obtain low-iron powder phospholipids.

The low-iron powder phospholipid has a water content of 1.38 g/100 g, a dry acetone-insoluble content of 93.98 g/100 g, and an iron content of 7.62 mg/kg in terms of acetone-insoluble matter. The sensory index is a yellow powder.

The product implements the national standard "GB28401 Food Additive Phospholipids".

Application 2

The low-iron hydrous phospholipids prepared in Example 4 are used in the preparation of solid phospholipids and powdered phospholipids.

The preparation process for preparing solid phospholipids and low-iron powder phospholipids with low-iron hydrous phospholipids is shown in FIG. 3 and FIG. 4, including the following steps:
(1) Concentrating the low-iron hydrous phospholipid prepared in Example 4 to obtain a concentrated hydrous phospholipid;
(2) Stirring the concentrated hydrous phospholipid to obtain a hydrous phospholipid elastomer;
(3) Drying the water-containing phospholipid elastomer to obtain a bar-shaped solid phospholipid;
(4) Pulverizing, sieving and drying the strip-shaped solid phospholipids to obtain powdered phospholipids.

In step (1), the low-iron water-containing phospholipid of Example 4 is concentrated to 45 g/100 g in a vacuum thin-film evaporator at 105° C. to obtain a concentrated water-containing phospholipid with a dry-base acetone-insoluble content of 95.41 g/100 g, 10.98 mg/kg iron content in terms of acetone insoluble matter, and brown translucent fluid.

In step (2), the concentrated hydrous phospholipid of step (1) is pushed into the mixer at a speed of 40 cm/min, the stirring revolution is 1100 rpm, and the stirring time is 20 s to obtain a continuous output hydrous phospholipid elastomer.

The water content and acetone insoluble content of the water-containing phospholipid elastomer are the same as those of the concentrated water-containing phospholipid, but the sensory indicators changed to yellow opaque semi-solid.

In step (3), the water-containing phospholipid elastomer continuously output in step (2) is fed into a continuous atmospheric pressure dryer through a set of feed ports with a pore diameter of 4 mm, and dried at 130° C. for 15 minutes to obtain continuous output strip solids phospholipids. The water content of the strip-shaped solid phospholipid is 5.47 g/100 g, the content of acetone-insoluble matter on a dry basis is 95.41 g/100 g, and the sensory index is a yellow strip-shaped solid.

In step (4), the solid phospholipids in strips of step (3) are pulverized, passed through an 18-mesh sieve, and dried in a double-cone cyclotron vacuum dryer at 60° C. for 30 min to obtain low-iron powder phospholipids.

The low-iron powder phospholipid has a water content of 1.23 g/100 g, a dry acetone-insoluble content of 95.41 g/100 g, and an iron content of 10.98 mg/kg in terms of acetone-insoluble matter. The sensory index is a yellow powder.

The product implements the national standard "GB28401 Food Additive Phospholipids".

The above detailed description is a specific description of one of the feasible embodiments of the present invention, which is not intended to limit the scope of the present invention. Any equivalent implementation or modification that does not depart from the present invention shall be included in the present invention.

What is claimed is:

1. A preparation method of a hydrous phospholipid composition, comprising the following steps:
   (1) adding soybean oil sediments into water and soaking to obtain saturated water-absorbing oil sediments;
   (2) subjecting the saturated water-absorbing oil sediments to a centrifugal sedimentation to obtain fluid; and
   (3) standing and layering the fluid for stratification to obtain a phospholipid layer containing the hydrous phospholipid composition and an oil layer;
   wherein the hydrous phospholipid composition comprises:
   (a) phospholipids;
   (b) oil; and
   (c) water in an amount of 70-80 g/100 g;
   wherein on a dry basis, acetone-insoluble matter constitutes 92.5-95.5 g/100 g; and
   wherein the iron content in the acetone-insoluble matter is no more than 18 mg/kg.

2. The preparation method of claim 1, wherein a sensory index of the hydrous phospholipid composition is a brown translucent fluid.

3. The preparation method according to claim 1, wherein in step (1), the soybean oil sediments and water has a mass ratio of 1:1-3.5, the soaking process is conducted at a temperature of 60-95° C. and a duration time of 1-3 h.

4. The preparation method according to claim 1, wherein before the soaking process, the soybean oil sediments in step (1) are dispersed into granules by stirring in water, and the granules have a particle size of less than or equal to 5 mm.

5. The preparation method according to claim 1, wherein in step (2), the centrifugal sedimentation is an intermittent centrifugal sedimentation, with a temperature of 60-95° C., a rotational speed of 500-2000 rpm, and a duration time of 5-15 min.

6. The preparation method according to claim 1, wherein in step (3), the standing and layering step is conducted under a temperature of 60-95° C.

7. The preparation method according to claim 1, further comprising: adding an electrolyte in the soaking process of step (1), wherein a mass fraction of the electrolyte in water is 0.01-0.3%, and the electrolyte includes at least one selected from the group consisting of acid, alkali and salt.

8. The preparation method according to claim 7, wherein the electrolyte is at least one selected from the group consisting of the following components: DL-sodium malic acid, L-malic acid, DL-malic acid, glacial acetic acid, citric acid, potassium citrate, sodium citrate, mono-citric acid Sodium, sodium gluconate, lactic acid, potassium lactate, sodium lactate, potassium carbonate, sodium carbonate, potassium bicarbonate, sodium bicarbonate, sodium sulfate, potassium chloride, potassium hydroxide, sodium hydroxide, hydrochloric acid, phosphoric acid, and sodium chloride.

* * * * *